United States Patent
Sheppard et al.

(10) Patent No.: US 7,796,596 B2
(45) Date of Patent: Sep. 14, 2010

(54) METHODS, SYSTEMS, AND COMPUTER PROGRAM PRODUCTS FOR PRODUCING, TRANSPORTING, AND CAPTURING NETWORK TRAFFIC DATA

(75) Inventors: Scott K. Sheppard, Decatur, GA (US); Henry J. Fowler, Jr., Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 968 days.

(21) Appl. No.: 11/196,128

(22) Filed: Aug. 3, 2005

(65) Prior Publication Data

US 2006/0029075 A1    Feb. 9, 2006

Related U.S. Application Data

(60) Provisional application No. 60/598,531, filed on Aug. 3, 2004.

(51) Int. Cl.
*H04L 12/28* (2006.01)
(52) U.S. Cl. .................. 370/390; 370/370; 370/389; 370/546
(58) Field of Classification Search .......... 370/370, 370/395, 389, 390, 546; 709/225
See application file for complete search history.

(56) References Cited

U.S. PATENT DOCUMENTS

| | | | |
|---|---|---|---|
| 6,122,499 A * | 9/2000 | Magnusson | 455/405 |
| 6,671,811 B1 * | 12/2003 | Diep et al. | 726/23 |
| 7,292,573 B2 * | 11/2007 | LaVigne et al. | 370/390 |
| 2002/0107961 A1 * | 8/2002 | Kinoshita | 709/225 |
| 2003/0026257 A1 * | 2/2003 | Xu et al. | 370/392 |
| 2003/0133412 A1 * | 7/2003 | Iyer et al. | 370/235 |
| 2004/0003094 A1 * | 1/2004 | See | 709/227 |
| 2005/0278565 A1 * | 12/2005 | Frattura et al. | 714/5 |

OTHER PUBLICATIONS

Cisco Systems, Cisco IOS Release 12.0(5)T, MPLS Virtual Private Networks, Dec. 1999. pp. 1-9.*
Guichard et al "MPLS and VPN Architectures" Oct. 31, 2000 Cisco Press.*
Bonica, Ronald et al "Constrained VPN Route Distribution" Internet Draft May 2004.*
Newton, Harry "Newton's Telecom Dictionary" 23rd Edition 2007.*

* cited by examiner

*Primary Examiner*—Dang T Ton
*Assistant Examiner*—Robert M Morlan
(74) *Attorney, Agent, or Firm*—Cantor Colburn LLP (57) ABSTRACT

Methods, systems, and computer program products producing, transporting, and capturing network traffic data are provided. The method includes associating a mirroring policy with a service profile assigned to a service subscriber, the service subscriber identified by a static Internet Protocol address. The method also includes associating a routing policy with the service profile. Upon detecting an active session for the service subscriber, the method includes mirroring traffic data generated as a result of subscriber activity, the mirroring implemented in accordance with the mirroring policy. The method further includes routing the mirrored traffic data through a public network to a central collection facility in accordance with the routing policy.

25 Claims, 5 Drawing Sheets

METHODS, SYSTEMS, AND COMPUTER PROGRAM PRODUCTS FOR PRODUCING, TRANSPORTING, AND CAPTURING NETWORK TRAFFIC DATA

CROSS-REFERENCE TO RELATED APPLICATIONS

This application claims the benefit of U.S. provisional patent application Ser. No. 60/598,531, filed Aug. 3, 2004, the entire contents of which are incorporated herein by reference.

BACKGROUND

The present invention relates generally to data processing, and more particularly to methods, systems, and computer program products for producing transporting, and capturing network traffic data.

A variety of value-added services or new product offerings are being introduced in the telecommunications industry in order to attract new customers and remain competitive in a marketplace that is continuously evolving in light of advancements in technology and customer demands. Some of these services are often quite successful as indicated by their widespread adoption among competitive service providers. In introducing new products and services, it is beneficial to measure the impact of these product/service offerings on a customer base. In a brick and mortar business, it is not a difficult task to measure the affects of launching a new product or service on the market, as virtually any inventory management system can provide details of the product demand in terms of units ordered and sold. However, it is not as simple to measure the impact of a new product or service launched by the communications service industry. Measuring changes in a customer's online activity upon the introduction of a new service, for example, would be difficult to assess due to the ubiquitous nature of the Internet.

What is needed, therefore, is a way to collect and analyze targeted network traffic data generated by subscribers of a network service.

BRIEF SUMMARY

Exemplary embodiments include methods, systems, and computer program products for producing, transporting, and capturing network traffic data. The method includes associating a mirroring policy with a service profile assigned to a service subscriber, the service subscriber identified by a static Internet Protocol address. The method also includes associating a routing policy with the service profile. Upon detecting an active session for the service subscriber, the method includes mirroring traffic data generated as a result of subscriber activity, the mirroring implemented in accordance with the mirroring policy. The method further includes routing the mirrored traffic data through a network to a central collection facility in accordance with the routing policy. The central collection facility is not the original destination of the original subscriber or packets.

A system for producing, transporting, and capturing network traffic data includes a first router in communication with a central collection facility via a network and an application executing on the router. The application performs a method. The method includes associating a mirroring policy with a service profile assigned to a service subscriber system, the service subscriber system identified by a static Internet Protocol address. The method also includes associating a routing policy with specific router interfaces. Upon receiving mirrored traffic data generated as a result of subscriber activity, the method includes routing the mirrored traffic data through the network to the central collection facility in accordance with the routing policy.

A computer program product for producing, transporting, and capturing network traffic data includes instructions for implementing a method. The method includes associating a mirroring policy with a service profile assigned to a service subscriber, the service subscriber identified by a static Internet Protocol address. The method also includes associating a routing policy with the service profile. Upon detecting an active session for the service subscriber, the method includes mirroring traffic data generated as a result of subscriber activity, the mirroring implemented in accordance with the mirroring policy. The method further includes routing the mirrored traffic data through a network to a central collection facility in accordance with the routing policy.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

DETAILED DESCRIPTION OF EXEMPLARY EMBODIMENTS

In accordance with exemplary embodiments, methods, systems, and computer program products for producing, transporting, and capturing network traffic data are provided. Embodiments include a traffic collection and analysis system that measures subscriber online behavior both before and after the introduction of a new product or service offering. New product/service offerings may be introduced to customers through one or more network elements, e.g., an existing enhanced end-user aggregation architecture (EEUA), in order to motivate current dial customers to become digital subscriber line (DSL) subscribers.

By collecting and analyzing customer behavior, both before and after introduction of a new product/service, a provider of the new product/service can gain a better understanding of the impact of the product/service offering across the entire customer base.

Figure 1:
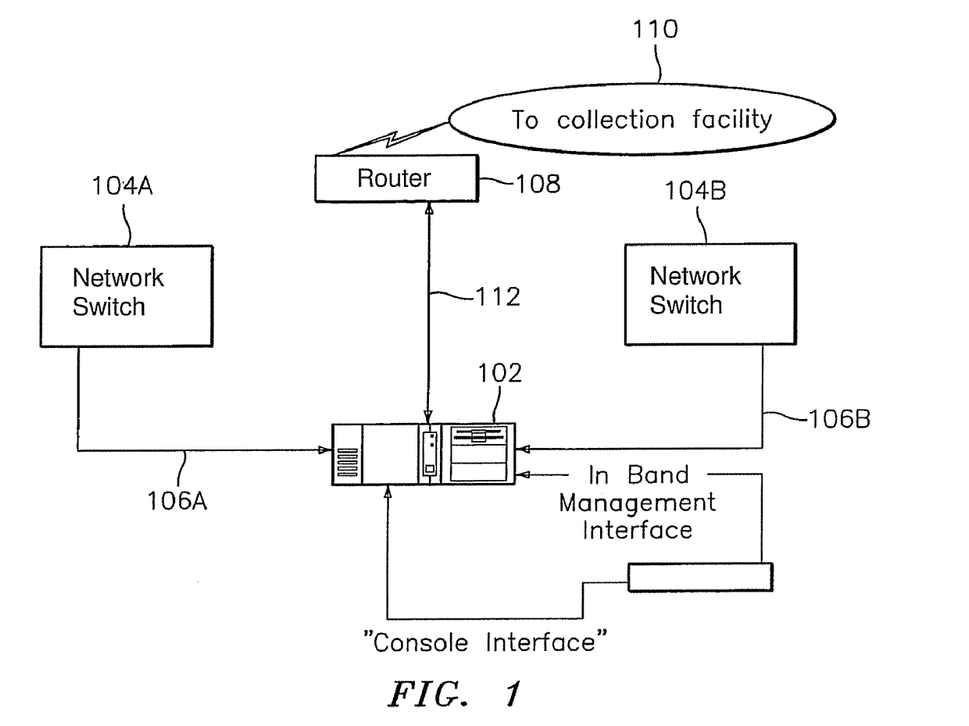
FIG. 1 is a block diagram of a system upon which dial up traffic capture and transport may be implemented in exemplary embodiments.
Figure 2:
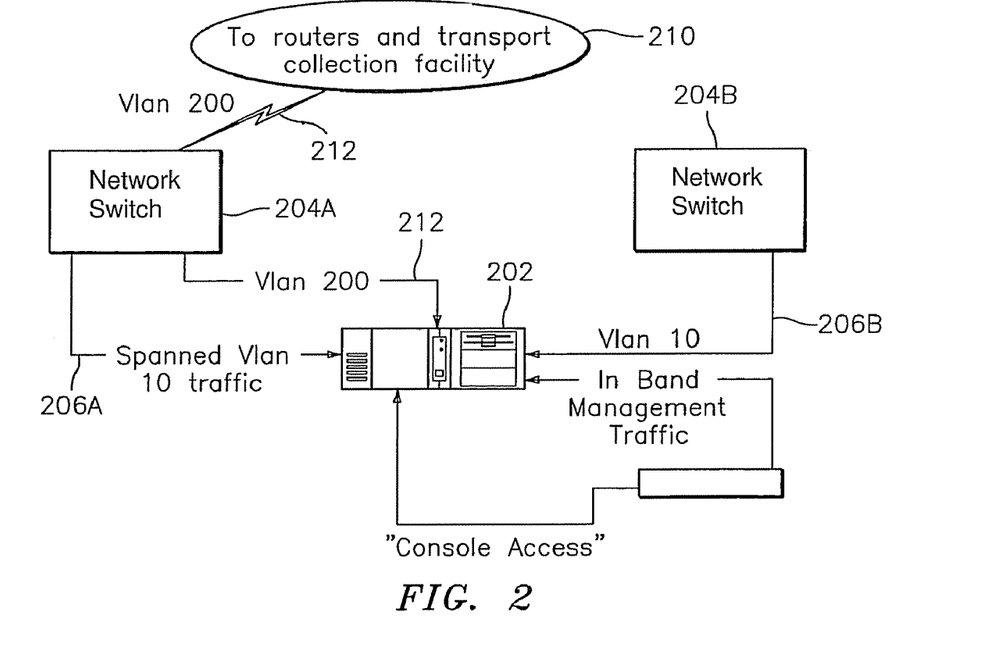
FIG. 2 is a block diagram of a system upon which the transport and capture of dial up traffic may be implemented in alternate embodiments.

For purposes of illustration, this technology is offered to subscribers in two locations referred to herein as Location 1 and Location 2 (e.g., representing a product trial location). The infrastructure for dial data capture in Location 1 is shown in FIG. 1. The infrastructure for dial data capture for Location 2 is shown in FIG. 2. These locations are collectively referred to as a regional location of a provider of the new product/service.

Turning now to FIG. 1, a system upon which data capture activities relating to Location 1 may be implemented will now be described in an exemplary embodiment. The system of FIG. 1 includes two switches 104A-104B that receive data traffic from subscribers (not shown) of the service provider entity. Switches 104A-104B may be, e.g., Cisco Catalyst™ switches. The type of data traffic may be, e.g., a request from a subscriber to access a particular web site. The traffic may be received as IP-based data packets. For each packet of data received, switches 104A-104B make a copy of the packet (also referred to herein as 'port spanning') before forwarding it on to the intended destination (e.g., a requested web site). The copied packet is then transmitted to a server 102 via a communications link, e.g., VLAN 106A-106B. Server 102 may be a route cache collector, such as a Compaq DL 360™ or other suitable device. The server 102 may act as a network host (e.g., terminal PC), such that routing is not a consideration other than connectivity to the proper communications links 106A-106B (e.g., Virtual Local Area Networks, or VLANs).

Server 102 collects the data traffic and processes the data (e.g., condensing the data into a database entry format). The processed data is then forwarded to a router 108, which in turn, sends the processed data on to a collection facility 110 over a public network, such as the Internet, for analysis. Various types of equipment may be utilized for collecting data traffic. For example, server 102 may employ hardware and collection software provided by Adlex, Inc. of Marlborough, Mass.

As indicated above, various data collection infrastructures may be employed in capturing network traffic. Location 2 depicted in the system of FIG. 2 provides similar elements as those depicted and described above with respect to Location 1 of FIG. 1 and, to this extent, will not be described further. The primary difference between the two infrastructures is that access to the network backbone in Location 1 is accessed via a direct connection 112 to the router 108, while access to the network backbone in Location 2 is provided by switches 204A and 204B and a VLAN 200 (212).

Figure 3:
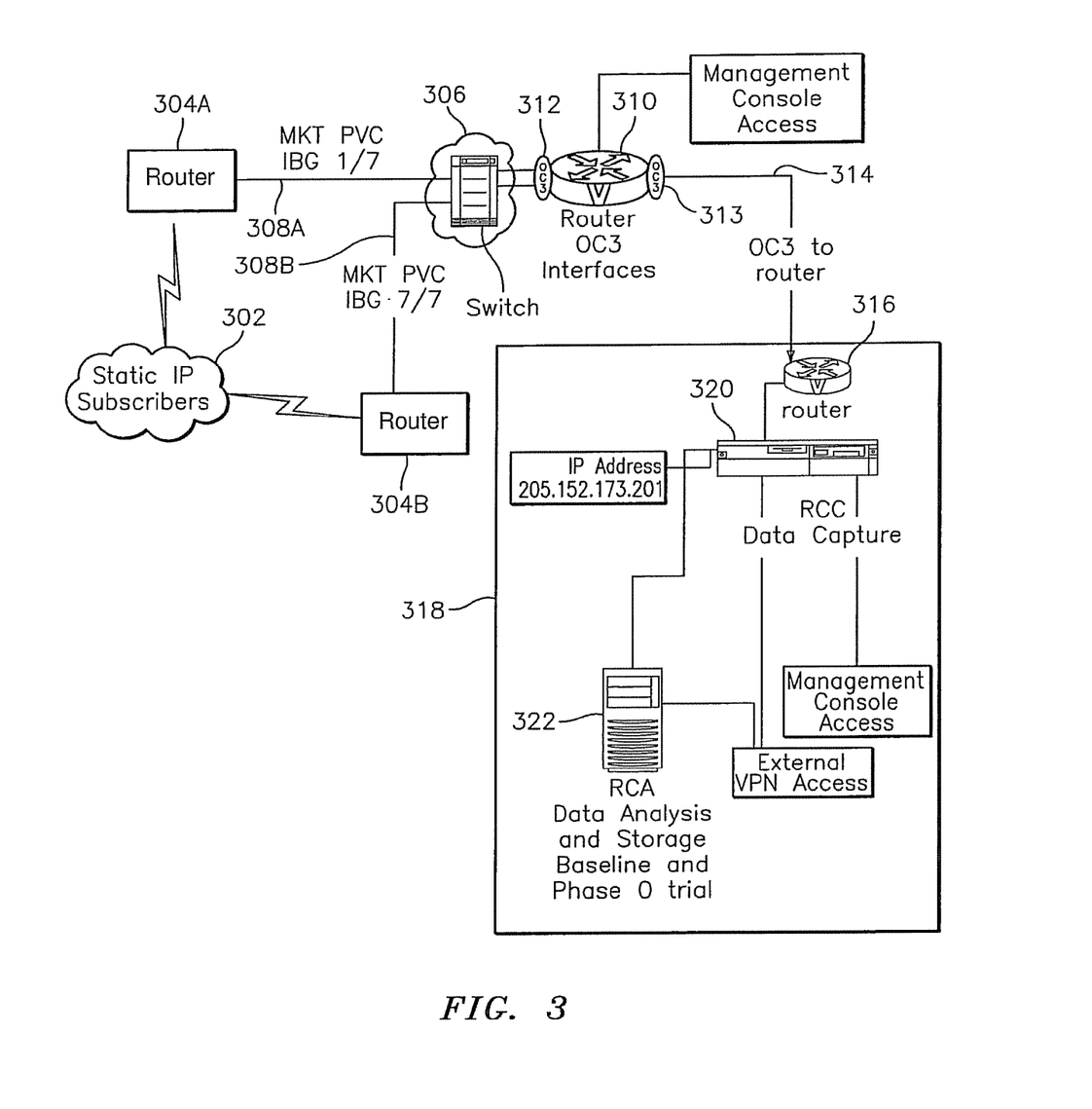
FIG. 3 is a block diagram of a system upon which traffic collection and analysis activities are implemented as a result of a new product/service offering in exemplary embodiments.

In accordance with exemplary embodiments, a system upon which the transport and capture of traffic generated as a result of a new product offering will now be described with respect to FIG. 3. The system of FIG. 3 includes a population of subscriber systems 302, where any given subscriber system is connected to one (and only one) of the routers 304A-304B (e.g., Nortel Shasta™), two of which are shown in FIG. 3. Routers 304A-304B receive and send data traffic to and from these subscribers 302. Also included in the system of FIG. 3 is a network 306 including a circuit switch or switches that provide an aggregation point for data traffic received from routers 304A-304B. Network 306 may be an ATM network, Ethernet using VLANs, or other suitable network. Network 306 communicates with routers 304A-304B via a dedicated transmission means 308A-308B, respectively. Routers 304A-304B copy data packets received from subscribers of network 302 (also referred to herein as "mirroring") and transmit the copies of the packets to network 306. The routers 304A-304B are configured such that the copies of the packets will not be routed to the Internet, even when the transmission means 308A and/or 308B are not operational.

In accordance with exemplary embodiments, routers 310 and 316 of FIG. 3 participate in the global Internet Border Gateway Protocol (BGP) routing schema and, thus, are able to route traffic to destinations within the public Internet. Router 310 includes an interface 312. The interface of router 310 may include rules for policy based routing or virtual private network routing and forwarding policy (VRF) routing for handling the transport of copied traffic as described further herein. The copied (mirrored) packets are not routed according to standard routing rules, because if they were, the packets would be routed to the Internet Protocol (IP) Destination Address of the packet, instead of to the collector. In such a case, no data would reach the collector, and the communication between the subscriber and the Internet would be disrupted by the extra packets. Router 310 transmits copied packets through a dedicated transmission means 314 to a central collection facility 318 via, e.g., router 316. This routing is a result of the rules used for PBR or VRF forwarding. Router 316 must include the same or similar policy-based routing interface as router 310. Router 316 communicates with a route cache collector 320 at the central collection facility 318.

The route cache collector 320 communicates with a route cache analyzer 322 also at the central collection facility 318. The route cache analyzer 322 may include internal storage for housing traffic data, both pre- and post-processing. Route cache collector 320 and route cache collector 322 may be deployed as network hosts (e.g., terminal PCs), such that routing is not a consideration other than connectivity to the proper communications links.

As indicated above, policy-based routing may be employed for routing the mirrored traffic through the network 306 to a collection facility. Policy-Based Routing (PBR) ensures that mirrored traffic for new product offering subscribers is never rerouted to the Internet. It also provides the ability to move new product offering traffic through a network independent of the original destination IP address of the mirrored subscriber traffic. This capability is important because the mirrored traffic is not encapsulated in packets with a common destination address. The packets retain their original destination addresses and would be routed in an unpredictable manner if PBR were not used.

PBR works by defining an incoming interface (e.g., 312). The interface 312 enables the creation of a policy, whereby all traffic entering the router (e.g., 310) across the interface is subject to the policy. The policy may define a route map with routing rules. The incoming traffic is tested against the route map and, if a match is found, the traffic is adjusted per the directions in the route map. As an example, a policy applied to interface 312 (e.g., ATM6/0 sub interfaces) is shown below.

---

There are 14 sub-interfaces involved in this design.
interface ATM6/0.7 point-to-point
ip policy route-map Location_NP (the policy)

---

From the policy, the route-map "Location_NP" takes effect. As shown:

```
route-map Location_NP
    set ip next hop 68.152.141.198 (the local address of POS 3/0 on
    destination router)
```

In this case, traffic will be directed to 68.152.141.198, which is the next hop address of router 316 at the centralized collection facility 318. The router 316 directs the mirrored traffic to a dedicated interface that is directly attached to the route cache collector 320.

As indicated above, VRF-based policies may be implemented for routing traffic through a network to a collection facility. VRF routing creates a unique virtual router with its own routing policies and tables within a physical router (e.g., router 310). Traffic routed within a VRF will stay in that VRF and will not be routed by the primary physical router. Thus, all incoming and outgoing traffic associated with the mirrored traffic across specific private virtual circuits (PVCs) or ATM switch/interfaces is subject to VRF routing. A sample process for building a VRF is described below.

Building a VRF that will carry mirrored traffic (router 310)

```
# Build the VRF:
ip vrf Scott_Sheppard_TB
    rd 205.152.37.113:1
    route-target export 205.152.37.113:1
    route-target import 205.152.37.113:1
!
!
    address-family ipv4 vrf Scott_Sheppard_TB
    no auto-summary
    no synchronization
    exit-address-family
!
# Add the route Map:
ip route vrf Scott_Sheppard_TB 0.0.0.0 0.0.0.0
10.10.15.2
!
# Build the OC-3 subinterfaces for primary and
redundant routing using frame-relay encapsulation:
interface POS5/1
    description CID:38.OBGS.600730;
NAME:ENG_LAB_Lindberg; DESC:LAB;
    no ip address
    no ip directed-broadcast
    encapsulation frame-relay IETF
    no ip mroute-cache
    load-interval 30
    no keepalive
    crc 16
    clock source internal
!
interface POS5/1.1 point-to-point
    description Mirrored_Traffic_VRF_Aware
    ip vrf forwarding Scott_Sheppard_TB
    ip address 10.10.15.1 255.255.255.252
    no ip directed-broadcast
    no cdp enable
    frame-relay interface-dlci 208
!
interface POS5/1.2 point-to-point
    description Backup_to_Primary_POS5/0
    ip address 68.152.141.197 255.255.255.252
    no ip directed-broadcast
    no ip mroute-cache
    no cdp enable
    frame-relay interface-dlci 209
!
# Build the ATM PVC links:
interface ATM6/0
    description OC3 ATM circuit id 38.OBGJ.600557 to ELR
    no ip address
```

```
    ip access-group 115 in
    no ip directed-broadcast
    load-interval 30
    no atm enable-ilmi-trap
    no atm ilmi-keepalive
!
interface ATM6/0.1 point-to-point
    description Mirrored router BCRTFLBT71W Traffic
    ip vrf forwarding Scott_Sheppard_TB
    ip address 10.0.67.194 255.255.255.252
    no ip directed-broadcast
    no atm enable-ilmi-trap
    pvc 6/32
        oam-pvc manage
        encapsulation aal5snap
    !
!
interface ATM6/0.2 point-to-point
    description Mirrored router BCRTFLBT73W Traffic
    ip vrf forwarding Scott_Sheppard_TB
    ip address 10.0.67.198 255.255.255.252
    no ip directed-broadcast
    no atm enable-ilmi-trap
    pvc 6/33
        encapsulation aal5snap
    !
!
interface ATM6/0.3 point-to-point
    description Mirrored router WPBHFLAN71W Traffic
    ip vrf forwarding Scott_Sheppard_TB
    ip address 10.0.67.202 255.255.255.252
    no ip directed-broadcast
    no atm enable-ilmi-trap
    pvc 6/34
        encapsulation aal5snap
    !
!
interface ATM6/0.4 point-to-point
    description Mirrored router WPBHFLAN72W Traffic
    ip vrf forwarding Scott_Sheppard_TB
    ip address 10.0.67.206 255.255.255.252
    no ip directed-broadcast
    no atm enable-ilmi-trap
    pvc 6/35
        encapsulation aal5snap
    !
!
interface ATM6/0.5 point-to-point
    description Mirrored router WPBHFLAN73W Traffic
    ip vrf forwarding Scott_Sheppard_TB
    ip address 10.0.67.210 255.255.255.252
    no ip directed-broadcast
    no atm enable-ilmi-trap
    pvc 6/36
        encapsulation aal5snap
    !
!
interface ATM6/0.6 point-to-point
    description Mirrored router WPBHFLGR71W Traffic
    ip vrf forwarding Scott_Sheppard_TB
    ip address 10.0.67.214 255.255.255.252
    no ip directed-broadcast
    no atm enable-ilmi-trap
    pvc 6/37
        encapsulation aal5snap
    !
!
interface ATM6/0.7 point-to-point
    description Mirrored router WPBHFLGR72W Traffic
    ip vrf forwarding Scott_Sheppard_TB
    ip address 10.0.67.218 255.255.255.252
    no ip directed-broadcast
    no atm enable-ilmi-trap
    pvc 6/38
        encapsulation aal5snap
    !
!
interface ATM6/0.8 point-to-point
    description Mirrored router WPBHFLGR73W Traffic
```

-continued

```
    ip vrf forwarding Scott_Sheppard_TB
    ip address 10.0.67.234 255.255.255.252
    no ip directed-broadcast
    no atm enable-ilmi-trap
    pvc 6/39
        encapsulation aal5snap
    !
!
interface ATM6/0.9 point-to-point
    description Mirrored router WPBHFLGA71W Traffic
    ip vrf forwarding Scott_Sheppard_TB
    ip address 10.0.67.238 255.255.255.252
    no ip directed-broadcast
    no atm enable-ilmi-trap
    pvc 6/40
        encapsulation aal5snap
    !
!
interface ATM6/0.41 point-to-point
    description Mirrored router FTPRFLMA71W Traffic
    ip vrf forwarding Scott_Sheppard_TB
    ip address 10.0.67.246 255.255.255.252
    no ip directed-broadcast
    no atm enable-ilmi-trap
    pvc 6/41
        encapsulation aal5snap
    !
!
interface ATM6/0.42 point-to-point
    description Mirrored router FTPRFLMA72W Traffic
    ip vrf forwarding Scott_Sheppard_TB
    ip address 10.0.67.250 255.255.255.252
    no ip directed-broadcast
    no atm enable-ilmi-trap
    pvc 6/42
        encapsulation aal5snap
    !
!
interface ATM6/0.43 point-to-point
    description Mirrored router WPBHFLAN74W Traffic
    ip vrf forwarding Scott_Sheppard_TB
    ip address 10.0.67.254 255.255.255.252
    no ip directed-broadcast
    no atm enable-ilmi-trap
    pvc 6/43
        encapsulation aal5snap
    !
!
interface ATM6/0.44 point-to-point
    description Mirrored router STRTFLMA71W Traffic
    ip vrf forwarding Scott_Sheppard_TB
    ip address 10.0.68.2 255.255.255.252
    no ip directed-broadcast
    no atm enable-ilmi-trap
    pvc 6/44
        encapsulation aal5snap
    !
!
    exit
```

Building the routing that instructs all received traffic to head toward the distal end of a FastEthernet interface that terminates on the collection system (e.g., 320):

```
# build the local VRF on the router 316 (or any other terminal router)
ip vrf Scott_Sheppard_TB
    rd 68.152.129.241:65528
    route-target export 6389:1
    route-target import 6389:1
# Build the links to router 310 with redundant traffic path and
# Encapsulation. This is the twin of a similar set up on router 310
interface POS3/0/0
    description TB_and_failover_link_to_router 310
    no ip address
    no ip directed-broadcast
    encapsulation frame-relay IETF
    load-interval 30
    no keepalive
!
interface POS3/0/0.1 point-to-point
    description TB_Mirroring
    ip vrf forwarding Scott_Sheppard_TB
    ip address 10.10.15.2 255.255.255.252
    no ip directed-broadcast
    no cdp enable
    frame-relay interface-dlci 208
!
# Build the link from the router 316 to the Sniffing system or to a switch for
# spanning traffic to several detection systems.
interface FastEthernet2/1/0
    description Exit_Interface_To_RCC_port_A
    ip vrf forwarding Scott_Sheppard_TB
    ip address 10.10.13.1 255.255.255.0
    no ip directed-broadcast
    full-duplex
    no cdp enable
# Set up a Static route to send all mirrored traffic from the POS
interfaces via FE # 2/1/0 to a fictitious IP address on the switch
(10.10.13.4).
ip route vrf Scott_Sheppard_TB 0.0.0.0 0.0.0.0 10.10.13.4
# Since a switch does not have an IP address (layer 2) is essential to create an
# ARP entry so the router "sees" the switch and will send packets to it.
#   Note there are two entries one of which is within the VRF.
arp vrf Scott_Sheppard_TB 10.10.13.4 0004.764a.cf6f ARPA
arp 10.10.13.3 0004.764c.cf6f ARPA
```

Configuring the ATM interfaces to forward traffic from the VRF. A sample sub-interface is provided below:

```
interface ATM6/0.1 point-to-point
    description Mirrored router ID BCRTFLBT71W
Traffic
    ip vrf forwarding _TB
    ip address 10.0.67.194 255.255.255.252
    no ip directed-broadcast
    no atm enable-ilmi-trap
    pvc 6/32
        oam-pvc manage
        encapsulation aal5snap
    !
```

Figure 4:
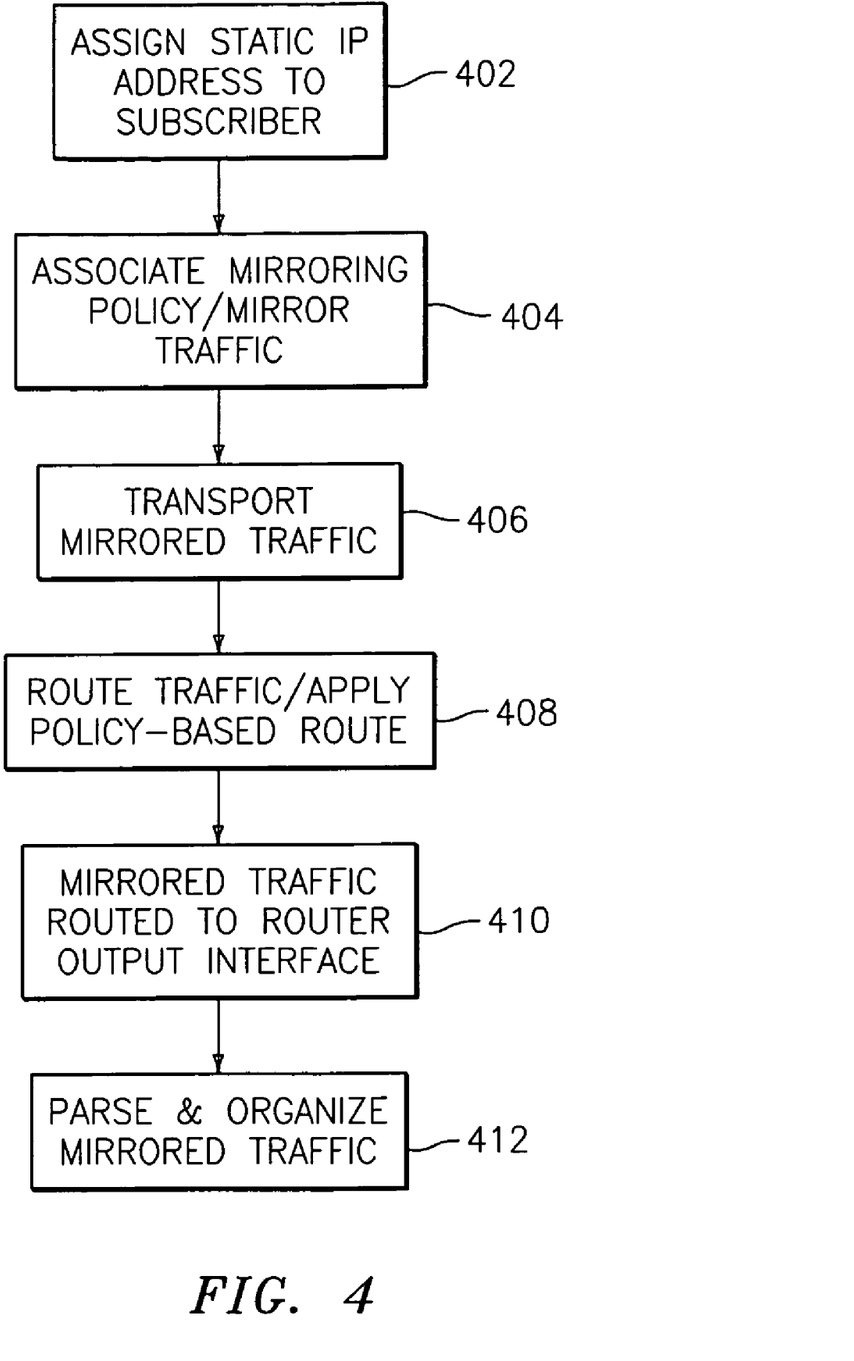
FIG. 4 is a process flow diagram describing a process for implementing traffic collection and analysis activities for a new product/service offering in exemplary embodiments.

Turning now to FIG. 4, a process for capturing, copying, and processing this traffic data will now be described in accordance with exemplary embodiments. At step 402, a new product offering subscriber of subscriber population 302 is assigned a static IP address. The static IP address is independent of the operation of mirroring. However, it may help with the analysis of the traffic later, because there is a one-to-one link between an IP address and a subscriber.

Figure 5:
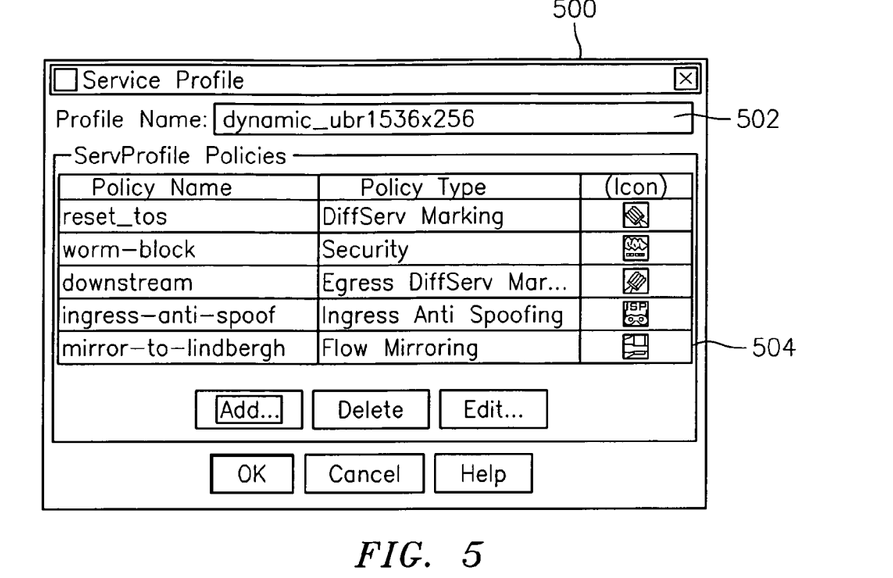
FIG. 5 is a user interface screen depicting options available for adding, editing, or deleting a mirroring policy.

At step 404, a mirroring policy is included in the service profile that is assigned to new product offering subscribers. The mirroring policy may be implemented via a user interface of the traffic collection and analysis system employed by router 310 As shown in FIG. 5, a user interface screen 500 through which a user may initiate a mirroring policy is provided. A user specifies a profile name in field 502 and may then add a new policy or edit an existing policy. For illustrative purposes, the mirroring policy provided in FIG. 5 is referred to as "mirror-to-lindbergh".

Figure 6:
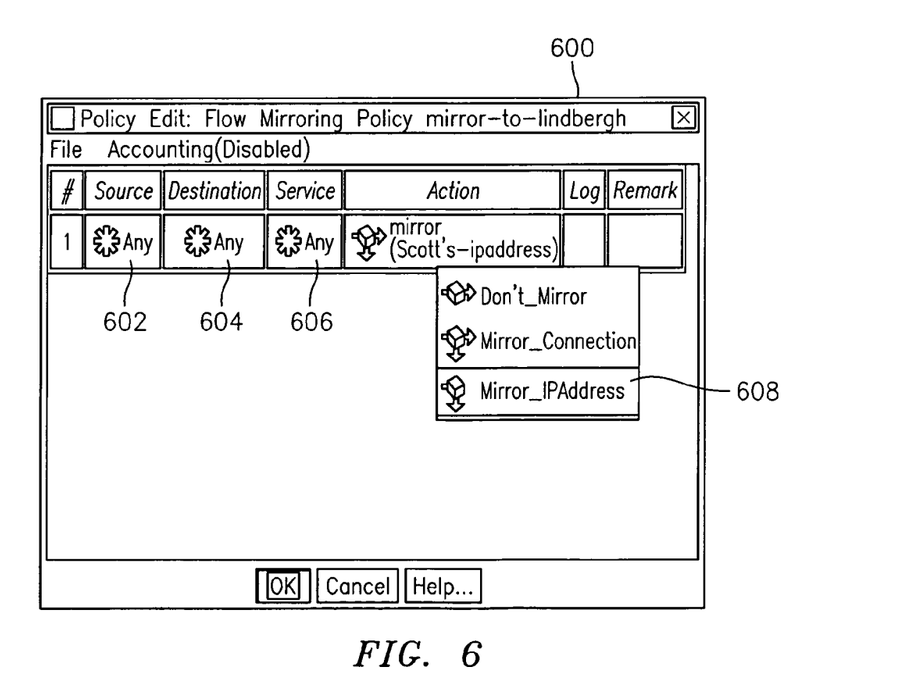
FIG. 6 is a user interface screen for defining a mirroring policy for routing traffic.

A user may define the mirroring policy using the traffic collection and analysis system as part of step 404. A sample user interface screen 600 for defining a mirroring policy is shown and described in FIG. 6. The flow mirroring policy specifies that all packets (i.e., any IP Source Address 602, and Destination Address 604, and any TCP/UDP service 606) will have the action of being mirrored to a specified IP address 608 (e.g., the address of router 310). It will be understood by those skilled in the art that alternative implementations may be used for directing mirrored traffic to a specific connection. For purposes of illustration, in the implementation shown in FIG. 6, the mirroring to a connection is accomplished by adding routing configuration information.

The mirroring policy of step 404 further includes specifying traffic routing procedures. A sample user interface 700 for specifying traffic data routing is shown and described in FIG. 7. First, a route is added via a subwindow 702 that will cause traffic to be steered to a mirroring interface (e.g., router 310), as mirrored traffic must never go to any of the interfaces that are used for routing user traffic. Also, when the mirroring interface becomes unavailable due to causes such as a communications link failure, a typical router response is to route traffic through alternate interfaces, and this must be prevented. In the exemplary embodiment, a summary route is added via subwindow 704 to ensure that traffic is not rerouted.

Figure 7:
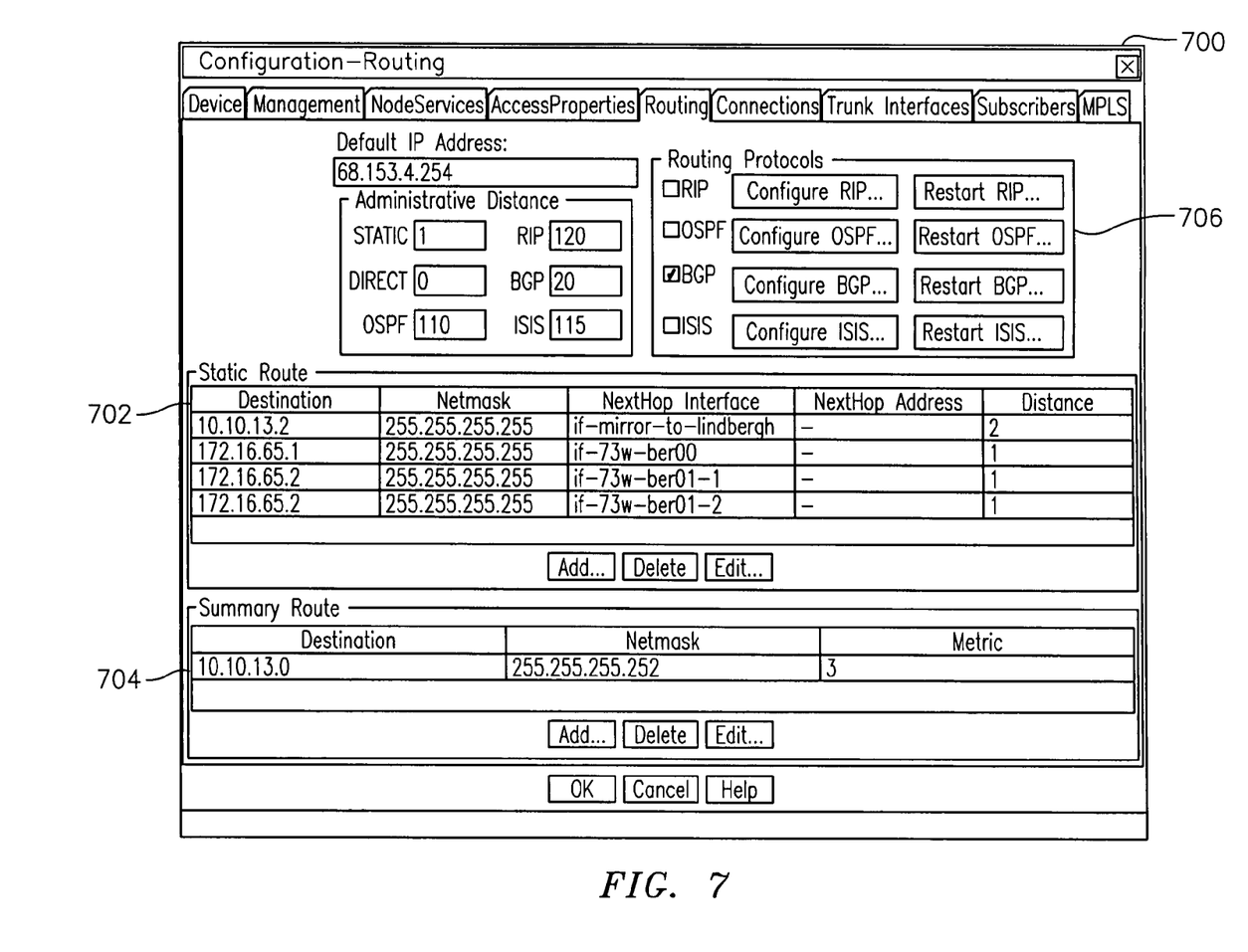
FIG. 7 is a user interface screen depicting options available for specifying traffic routing procedures.

Finally, these routes for mirrored traffic must not be made known to other routers. For this purpose, exemplary embodiments include a route policy filter subwindow 706 for preventing the static and summary routes from being used by IP routing protocols (e.g., Border Gateway Protocol (BGP), Open Shortest Path First (OSPF), etc.).

During an active session, subscriber-related traffic (traveling to and from the subscriber) is mirrored from the router(s) 304A/304B depending on which router the subscriber is associated with that receives the traffic. Mirroring of traffic means that for up- and downstream traffic relating to a given static EP address, a copy will be made of every byte of the traffic. The original data packet is forwarded to a destination IP address (e.g., a target web site of the subscriber) (not shown), while the copy or mirror of the subscriber's traffic is then processed as described herein.

At step 406, the transport of the mirrored traffic is carried by dedicated transmission means 308A-308B (e.g., Permanent Virtual Circuit (PVC), VLAN, etc.) specifically established to handle only mirrored traffic from a given router 304A/304B. For illustrative purposes, fourteen routers are employed in the new product/service offering (two of which are shown in FIG. 3). However, it will be understood that any number of routers may be utilized as desired. To move mirrored traffic from the routers 304A-304B, a next-hop routing scheme may be employed to direct the mirrored packets to private interface 312 of router 310.

At step 408, the mirrored traffic is moved across the network 306 to router 310. In exemplary embodiments, a policy-based route may be applied to the traffic in order to force the traffic to move to a next-hop router (e.g., router 316) via its interface. As indicated above, this transmission may include transfer of traffic over a public network. Alternatively, routable traffic may be placed in a VRF at the router 310 via an interface of the switch of network 306. The VRF may include an egress interface that allows live packets to be sent to the router 316, ensuring that the packets will not be rerouted to other networks including the Internet.

At step 410, the traffic mirrored on the routers 304A-304B reaches a specific destination IP address independent of where the original new product offering subscriber traffic was destined. It will be understood that the original source and destination address of packets are not changed (i.e., the mirrored packets are not encapsulated). However, this destination may be defined as a next-hop IP address, which, in the system of FIG. 3 is shown as 68.152.141.198, the distal end of an interface between router 310 and router 316. When the mirrored traffic arrives at the centralized collection facility 318, it may again be subjected to a policy-based route. In this case, the destination is a pseudo-interface on route cache collector 320. The sniffing abilities of the route cache collector 320 provide the capability to capture traffic from a span port on a switch (e.g., switch at network 306) or from a "T" splitter inserted into router or switch cabling. Thus, the sniffing interfaces do not support an explicit IP address. As a result, the mirrored traffic is directed to a specific router output interface FastEthernet2/1/0 that is directly attached to the sniffing route cache collector 320.

At step 412, the route cache analyzer 322 parses the mirrored new product offering traffic into preliminary tables and organizes it in various ways. For example, it may provide data integrity correction, such as matching dial user names to known static IP addresses used by the same subscriber in the new product offering trial. Periodically, this metadata may be polled by the route cache analyzer 322 where actual statistical methods are applied to the data, and all data for the project is stored in a database (e.g., at the route cache analyzer 322) where other operations may be carried out. The route cache collector 320 may also host a web server, allowing interaction by study users and operators.

As described above, exemplary embodiments can be implemented in the form of computer-implemented processes and apparatuses for practicing those processes. Exemplary embodiments can also be implemented in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. Exemplary embodiments can also be implemented in the form of computer program code, for example, stored in a storage medium, loaded into and/or executed by a computer, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

The invention claimed is:

1. A method for producing, transporting, and capturing network traffic data, comprising:
    associating a mirroring policy with a service profile assigned to a service subscriber, the service subscriber identified by a static Internet Protocol address;
    creating a routing policy via an interface configured for a router, such that handling of traffic data entering the router is subject to the routing policy;
    associating the routing policy with the service profile;
    receiving mirrored traffic data generated as a result of subscriber activity identified for the service profile, the mirrored traffic data representing a copy of the traffic data generated as a result of the subscriber activity, and is provided in accordance with the mirroring policy; and routing the mirrored traffic data to a central collection facility in accordance with the routing policy through a dedicated transmission means;

wherein a destination address of the traffic data resulting from the subscriber activity is different than a destination address of the central collection facility;

the mirrored traffic data comprising:
data;
an original source address; and
an original destination address;

wherein routing the mirrored traffic data includes transmitting the mirrored traffic data to the destination address of the central collection facility without changing or encapsulating the original source address and the original destination address of the mirrored traffic data.

2. The method of claim 1, wherein the routing policy is a virtual private network routing and forwarding policy.

3. The method of claim 1, wherein the transporting is through a public network that participates in the Internet.

4. The method of claim 1, further comprising comparing the mirrored traffic data with historical traffic data operable for detecting changes in subscriber activity.

5. The method of claim 1, wherein the subscriber activity is network activity initiated at a subscriber system.

6. The method of claim 1, wherein the subscriber activity is network activity produced in response to network activity initiated at a subscriber system.

7. The method of claim 1, wherein the routing policy includes a summary route, the summary route preventing the traffic from being routed to alternate interfaces.

8. A system for producing, transporting, and capturing network traffic data, comprising:

a router in communication with a central collection facility via a network; and an application executing on the router, the application performing:

associating a mirroring policy with a service profile assigned to a service subscriber system, the service subscriber system identified by a static Internet Protocol address;

creating a routing policy via an interface configured for the router via the application, such that handling of traffic data entering the router is subject to the routing policy;

associating the routing policy with the service profile; and receiving mirrored traffic data generated as a result of subscriber activity identified for the service profile, the mirrored traffic data representing a copy of the traffic data generated as a result of the subscriber activity, and is provided in accordance with the mirroring policy; and routing the mirrored traffic data to the central collection facility in accordance with the routing policy through a dedicated transmission means;

wherein a destination address of the traffic data resulting from the subscriber activity is different than a destination address of the central collection facility;

the mirrored traffic data comprising:
data;
an original source address; and
an original destination address;

wherein routing the mirrored traffic data includes transmitting the mirrored traffic data to the destination address of the central collection facility without changing or encapsulating the original source address and the original destination address of the mirrored traffic data.

9. The system of claim 8, wherein the routing policy is a virtual private network routing and forwarding policy.

10. The system of claim 8, wherein the transporting is through a public network that participates in the Internet.

11. The system of claim 8, wherein the collection facility compares the mirrored traffic data with historical traffic data operable for detecting changes in subscriber activity.

12. The system of claim 8, wherein the subscriber activity is network activity initiated at a subscriber system.

13. The system of claim 8, wherein the subscriber activity is network activity produced in response to network activity initiated at a subscriber system.

14. The system of claim 8, wherein the routing policy includes a summary route, the summary route preventing the traffic from being routed to alternate interfaces.

15. A computer program product for producing, transporting, and capturing network traffic data, the computer program product comprising instructions tangibly embodied on a non-transitory storage medium, which when executed cause a computer to implement a method, the method comprising the steps of:

associating a mirroring policy with a service profile assigned to a service subscriber, the service subscriber identified by a static Internet Protocol address;

creating a routing policy via an interface configured for a router, such that handling of traffic data entering the router is subject to the routing policy;

associating the routing policy with the service profile;

receiving mirrored traffic data generated as a result of subscriber activity identified for the service profile, the mirrored traffic data representing a copy of the traffic data generated as a result of the subscriber activity, and is provided in accordance with the mirroring policy; and routing the mirrored traffic data to a central collection facility in accordance with the routing policy;

wherein a destination address of the traffic data resulting from the subscriber activity is different than a destination address of the central collection facility;

the mirrored traffic data comprising:
data;
an original source address; and
an original destination address;

wherein routing the mirrored traffic data includes transmitting the mirrored traffic data to the destination address of the central collection facility without changing or encapsulating the original source address and the original destination address of the mirrored traffic data.

16. The computer program product of claim 15, wherein the routing policy is a virtual private network routing and forwarding policy.

17. The computer program product of claim 15, wherein the transporting is through a public network that participates in the Internet.

18. The computer program product of claim 15, further comprising instructions for comparing the mirrored traffic data with historical traffic data operable for detecting changes in subscriber activity.

19. The computer program product of claim 15, wherein the subscriber activity is network activity initiated at a subscriber system.

20. The computer program product of claim 15, wherein the subscriber activity is network activity produced in response to network activity initiated at a subscriber system.

21. The method of claim 1, wherein the routing policy comprises:
  a routing policy filter; and
  mirror routing information;
  the policy filter operating to prevent publication of the mirror routing information.

22. The system of claim 8, wherein the routing policy comprises:
  a routing policy filter; and
  mirror routing information;
  the policy filter operating to prevent publication of the mirror routing information.

23. The computer program product of claim 15, wherein the routing policy comprises:
  a routing policy filter; and
  mirror routing information;
  the policy filter operating to prevent publication of the mirror routing information.

24. The method of claim 1, further comprising:
  creating the mirroring policy via a user interface, the user interface providing a user interface screen with data fields; wherein creating the mirroring policy includes:
  identifying source addresses and destination addresses of traffic data subject to mirroring via corresponding data fields of the user interface screen; and
  identifying an address to which the traffic data subject to mirroring, upon its receipt, will be transmitted.

25. The method of claim 1, wherein creating the routing policy via an interface configured for a router includes defining a route map including routing rules, testing incoming traffic data against the route map, and upon determining a match is found, adjusting the routing of the traffic data according to directions in the route map.

* * * * *